`US010095484B2`

United States Patent
Tateishi

(10) Patent No.: US 10,095,484 B2
(45) Date of Patent: Oct. 9, 2018

(54) AUTOMATIC PROGRAM SYNTHESIS USING MONADIC SECOND-ORDER LOGIC

(71) Applicant: INTERNATIONAL BUSINESS MACHINES CORPORATION, Armonk, NY (US)

(72) Inventor: Takaaki Tateishi, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 14/970,294

(22) Filed: Dec. 15, 2015

(65) Prior Publication Data

US 2017/0168780 A1    Jun. 15, 2017

(51) Int. Cl.
G06F 9/44       (2018.01)
G06F 8/30       (2018.01)
G06F 9/445      (2018.01)

(52) U.S. Cl.
CPC .......... *G06F 8/315* (2013.01); *G06F 9/44589* (2013.01)

(58) Field of Classification Search
CPC ................................. G06F 8/00–8/78
See application file for complete search history.

(56) References Cited

U.S. PATENT DOCUMENTS

| 5,764,951 | A | * | 6/1998 | Ly | G06F 8/4452 |
| | | | | | 716/103 |
| 6,031,994 | A | * | 2/2000 | Radigan | G06F 8/433 |
| | | | | | 717/151 |
| 8,132,163 | B2 | | 3/2012 | Tal et al. | |
| 8,381,199 | B2 | | 2/2013 | Tateishi et al. | |
| 8,402,439 | B2 | | 3/2013 | Gulwani et al. | |
| 8,739,137 | B2 | | 5/2014 | Siskind et al. | |
| 9,002,758 | B2 | | 4/2015 | Gulwani et al. | |
| 2003/0200540 | A1 | * | 10/2003 | Kumar | G06F 8/4441 |
| | | | | | 717/161 |
| 2009/0260015 | A1 | * | 10/2009 | Batog | G06F 8/4452 |
| | | | | | 718/104 |
| 2010/0333201 | A1 | * | 12/2010 | Haviv | G06F 8/43 |
| | | | | | 726/22 |

OTHER PUBLICATIONS

Tateishi et al., "Path- and index-sensitive string analysis based on monadic second-order logic". ACM Trans. Softw. Eng. Methodol. 22, 4, Article 33 (Oct. 2013), 33 pages. DOI=http://dx.doi.org/10.1145/2522920.2522926.*

(Continued)

*Primary Examiner* — Chameli Das
*Assistant Examiner* — Joanne Macasiano
(74) *Attorney, Agent, or Firm* — Tutunjian & Bitetto, P.C.; Vazken Alexanian

(57) ABSTRACT

A method is provided for synthesizing a computer program by a hardware processor and a program synthesizer. The method includes representing program components and registers by position set variables and constraints on the position set variables using Monadic Second-Order Logic. The method further includes determining potential combinations of the program components by solving the constraints. The method also includes forming the computer program from at least one of the potential combinations.

19 Claims, 3 Drawing Sheets

(56) References Cited

OTHER PUBLICATIONS

Kelb, Peter, et al. "MOSEL: A flexible toolset for monadic second-order logic." International Workshop on Tools and Algorithms for the Construction and Analysis of Systems. Springer, Berlin, Heidelberg, 1997.*

Aderhold, M., "Automated Synthesis of Induction Axioms for Programs with Second-Order Recursion", Automated Reasoning, vol. 6173 of the series Lecture Notes in Computer Science, pp. 263-277, Jul. 2010.

David, et al., "Second-Order Propositional Satisfiability", ARXIV: 1409.4925v4, Jan. 2015, pp. 1-19.

Srivastava, et al., "From Program Verification to Program Synthesis", POPL'10, Jan. 2010, 14 Pages.

* cited by examiner

AUTOMATIC PROGRAM SYNTHESIS USING MONADIC SECOND-ORDER LOGIC

BACKGROUND

Technical Field

The present invention relates generally to computer programming and, in particular, to automatic program synthesis using Monadic Second-Order Logic.

Description of the Related Art

Program synthesis is a special form of automatic programming. The goal of program synthesis is to automatically construct a program that satisfies a given high-level specification. However, among other deficiencies, current solutions for program synthesis are not able to handle second-order functions. An exemplary second-order function is the map function found in many computer programming languages (e.g., such as the MetaLanguage (ML) programming language). Another exemplary second-order function is qsort in the C programming language.

Thus, there is a need for improved program synthesis that overcomes the aforementioned deficiency.

SUMMARY

According to an aspect of the present principles, a method is provided for synthesizing a computer program by a hardware processor and a program synthesizer. The method includes representing program components and registers by position set variables and constraints on the position set variables using Monadic Second-Order Logic. The method further includes determining potential combinations of the program components by solving the constraints. The method also includes forming the computer program from at least one of the potential combinations.

According to another aspect of the present principles, a computer program product is provided for synthesizing a computer program by a hardware processor and a program synthesizer. The computer program product includes a non-transitory computer readable storage medium having program instructions embodied therewith. The program instructions are executable by a computer to cause the computer to perform a method. The method includes representing program components and registers by position set variables and constraints on the position set variables using Monadic Second-Order Logic. The method further includes determining potential combinations of the program components by solving the constraints. The method also includes forming the computer program from at least one of the potential combinations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to automatic program synthesis using Monadic Second-Order Logic (interchangeably abbreviated as "MSOL" and "M2L", hereinafter "M2L").

In an embodiment, constraints on computer program components (hereinafter "program components") and registers to be used by the program components in a computing device are represented using M2L. For example, in an embodiment, the program components and the registers are represented by position set variables and constraints on the position set variables. The potential combinations of the program components, which will form an output computer program, can be determined by solving the constraints. As used herein, the term "position set variable" refers to a variable that takes a set of constant values used in Monadic Second-Order Logic. Moreover, as used herein, the term "position variable" refers to a variable that takes a constant value used in Monadic Second-Order Logic.

In M2L, positions and subsets of positions can be directly mentioned in a string, unlike regular expressions or automata. The feature of M2L is exploited by the present principles.

In an embodiment, the present principles involve the following input: a set of first-order functions F1; a set of second-order functions F2; and a set of constraints C.

In an embodiment, the set of constraints is written in M2L, where functions (in the set F1 and the set F2), function parameters, and function return values are represented by consecutive positions in M2L.

In an embodiment, C(f) is a constraint on the function f, which is denoted by a M2L formula such as, for example, $[[f]](x[0], x[1], \ldots, x[N])$, where $[[f]]$ is a M2L predicate, and $x[0], \ldots, x[N]$ are position variables representing parameters $(x[0], \ldots, x[N-1])$ and a return value $(x[N])$.

In an embodiment, the present principles involve the following output: a set of constraints C' whose satisfying examples represent programs.

In an embodiment, the syntax of the program is a sequence of statements each of which is denoted by $v[N]=f(v[0], v[1], \ldots, v[N-1])$, where $v[0], \ldots, v[N]$ are literals or program variables of function f.

Figure 1:
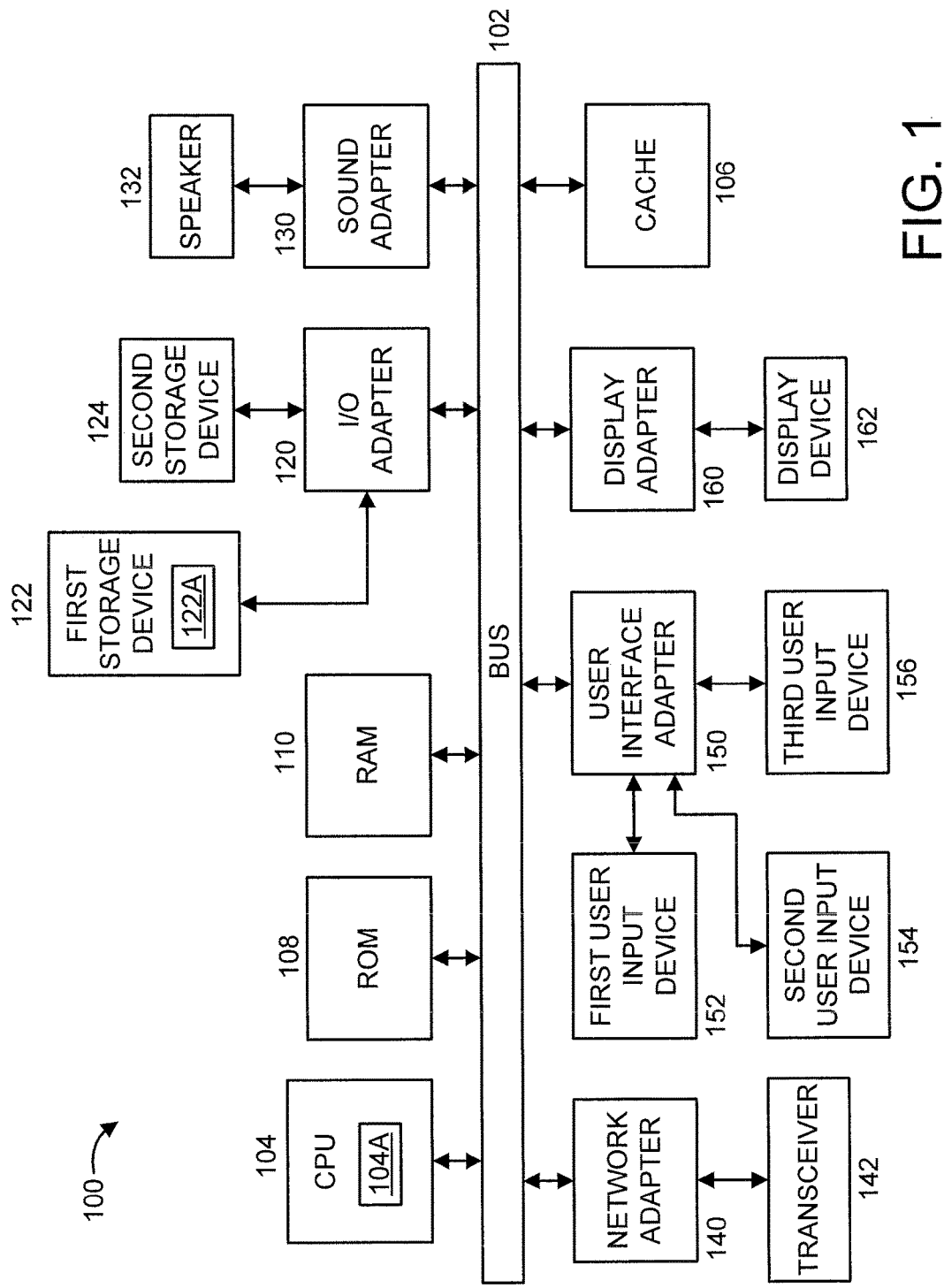
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

The CPU 104 includes a set of registers 104A. While FIG. 1 shows the preceding implementation of registers 104A in the CPU 104, the present principles can be employed with any type of register implementation, as readily appreciated by one of ordinary skill in the art, given the teachings of the present principles provided herein.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. In an embodiment, the first storage device 122 includes a program synthesizer 122A for synthesizing programs in accordance with the teachings of the present principles. As such, the program synthesizer 122A herein can be enabled with any of the capabilities of interpreting (for, e.g., generating code), compiling (for, e.g., translating the code into intermediate form as an object file), linking (for e.g., transforming the object file into an executable program), and so forth, as readily appreciated by one of ordinary skill in the art.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
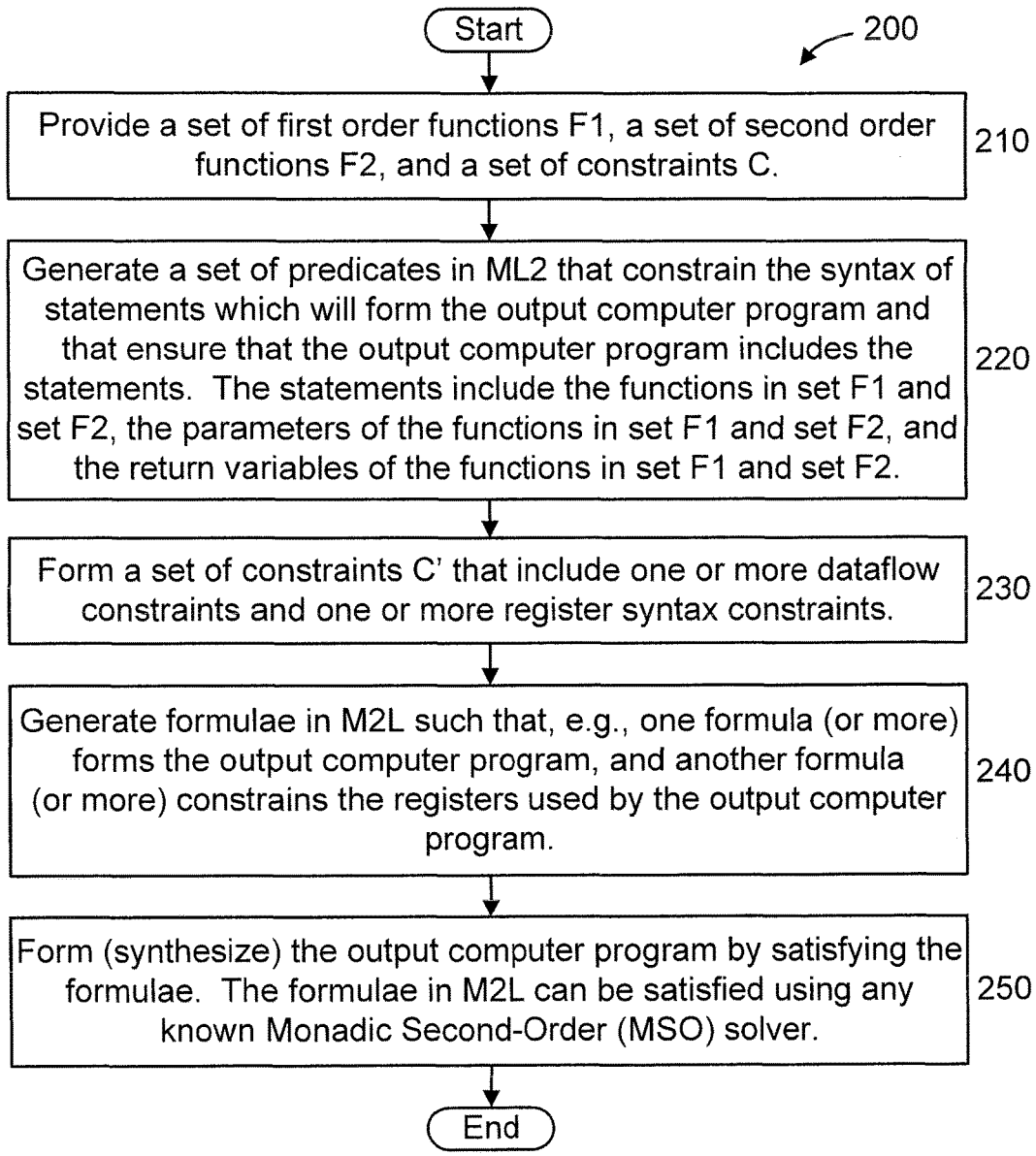
FIG. 2 shows an exemplary method 200 for automatic program synthesis using Monadic Second-Order Logic, in accordance with an embodiment of the present principles.

Moreover, it is to be appreciated that processing system 100 may perform at least part of the method described herein including, for example, at least part of method 200 of FIG. 2.

FIG. 2 shows an exemplary method 200 for automatic program synthesis using Monadic Second-Order Logic, in accordance with an embodiment of the present principles.

At step 210, provide a set of first order functions F1, a set of second order functions F2, and a set of constraints C. The sets F1, F2, and C form the inputs to method 200 and are used to synthesis an output computer program. The set F1 includes first order functions $f_1 0, \ldots, f_1 N$. The set F2 includes second order functions $f_2 0, \ldots, f_2 N$.

At step 220, generate a set of predicates in ML2 that constrain the syntax of statements which will form the output computer program and that ensure that the output computer program includes the statements. The statements include the functions in set F1 and set F2, the parameters of the functions in set F1 and set F2, and the return variables of the functions in set F1 and set F2. In an embodiment, one statement (hereinafter also referred to as "Stmt1") includes the functions in set F1 and the parameters and return variables of the functions in set F1, and another statement (hereinafter also referred to as "Stmt2") includes the functions in set F2 and the parameters and return variables of the functions in set F2. In an embodiment, yet another statement (hereinafter "Stmt") performs a logical OR operation (e.g., "|") between Stmt1 and Stmt2.

At step 230, form a set of constraints C' that include one or more dataflow constraints and one or more register syntax constraints. The constraints can include constraints on read variables and write variables with respect to dataflow and/or with respect to the registers to be used by the output computer program.

At step 240, generate formulae in M2L such that, e.g., one formula (or more) forms the output computer program from the statement Stmt (and, hence, from statements Stmt1 and Stmt2), and another formula (or more) constrains the registers used by the output computer program. The formulae can be considered to be a high-level specification whose provable satisfaction results in the output computer program.

At step 250, form (synthesize) the output computer program by satisfying the formulae. The formulae in M2L can be satisfied using any known Monadic Second-Order (MSO) solver, as known and readily appreciated by one of ordinary skill in the art. Solving of the formulae can result in one or more combinations of the program components forming an output computer program that satisfies the high-level specification.

A description will now be given of a specific embodiment of the present principles. However, it is to be appreciated that the following embodiment is merely illustrative and, thus, other functions, constraints, and programming languages can be used, while maintaining the spirit of the present principles.

The following example relates to a set of first-order functions F1, a set of second-order functions F2, and a set of constraints C. The sets F1, F2, and C form the input to the methodology of the present principles. The output to the methodology of the present principles is a set of constraints C' whose satisfying examples represent output computer programs.

Generate the following M2L predicates. The generation of these M2L predicates corresponds to step 220 of method 200.

For all f in F1 and F2, Pred[f](S)=ex1 p, x[0], . . . , x[N]: {p, x[0], . . . , x[N]}=S & p+1=x[0] & x[0]+1= x[1] & . . . & x[N−1]+1=x[N] & 'f'(p) & C(f)(x[0], . . . , x[N])—constraints the syntax of statements which consist of function 'f', position variables representing parameters x[0], . . . , x[N−1] and a position variable representing a return variable x[N]. In the preceding, S is a position set variable, p is a position variable, and C(f) is a constraint on the function f. It is to be noted that in general the variables with uppercase letters (e.g., S, P, IN, OUT, SEP, etc.) are position set variables of monadic second-order logic (M2L), each of which represents (is associated with) an element of a program (e.g., register, instruction, statement). It is to be further noted that the variables with lowercase letters (e.g., p, r, w) are position variables of monadic second-order logic (M2L), each of which represents (is associated with) an element of a program (e.g., register, instruction, statement).

It is to be also noted that the predicates (e.g.: Pred[f0]( . . . ) and RegIn( . . . )) are not variables. The predicates are defined in the form of "Pred( . . . )= . . . ".

Stmt1(P)=Pred[f0](P)| . . . |Pred[fN](P) where F1={$f_10, \ldots, f_1N$}, where P is a position set variable.
Stmt2(P)=Pred[f0](P)| . . . |Pred[fN](P) where F2={$f_20, \ldots, f_2N$}.
Stmt(P)=Stmt1(P)|Stmt2(P), where "|" is a logical OR operation in M2L.
Prog(P,SEP,IN,OUT)=closure(P,SEP,Stmt) & IN⊆P & OUT⊆P & IN∩OUT=∅, where Prog is a predicate, and P, SEP, IN, and OUT are position set variables.

It is to be appreciated that the preceding predicates (corresponding to step 220 of method 200) ensure that a program includes the preceding statements.

Generate the following M2L constraints. The generation of these constraints corresponds to step 230 of method 200.

WRPair(w,r,P,SEP,R)=OutOfProg(w,P,SEP) & InOfProg(r,P,SEP) & w<r & consecutive(w,r,R), where OutOfProg and InOfProg are predicates defined herein below.
FlowTo(w,r,P,SEP,R1, . . . , RN)=(WRPair(w,r,P,SEP,R1)| . . . |WRPair(w,r,P,SEP,RN)) & EQ(w,r), where Flowto denotes the dataflow constrain, and R1, . . . RN is a set of positions representing registers, and EQ is a predicate representing the equality of values specified by the position variable r and w.
RegIn(P,SEP,IN,R1, . . . , RN)=∀IS. InOfProg(S,P,SEP)⇒∀ri. ri∈IS⇒ ri∈IN|∃ro. FlowTo(ro,ri,P,SEP,R1, . . . , RN), where the preceding variables with uppercase letters (e.g., P, SEP, IN, S, IS) are position set variables, the preceding variables with lower case letters (e.g., ri, ro) are position variables, and R1, . . . RN is a set of positions representing registers. It is to be noted that the predicates (e.g., RegIn( . . . )) are not variables.
RegOut(P,SEP,OUT,R1, . . . , RN)=∀o. OutOfProg(o,P,SEP)⇒ o∈OUT|∃i: FlowTo(o,I,P,SEP,R1, . . . , RN), where the preceding variables with uppercase letters (e.g., P, SEP, OUT, I) are position set variables, the preceding variables with lower case letters (e.g., i, o) are position variables, and R1, . . . RN is a set of positions representing registers. It is to be noted that the predicates (e.g., RegOut( . . . )) are not variables.
Reg(P,SEP,IN,OUT,R1, . . . , RN)=RegIn(P,SEP,IN,R1, . . . , RN) & RegOut(P,SEP,OUT,R1, . . . , RN)—constraints syntax of registers.

It is to be appreciated that the preceding constraints on the registers ensure that writing a variable and reading the same variable are repeated.

Generate the following M2L formulae where PROG, SEP, IN, OUT, and R1, . . . , RN are free variables. The generation of these formulae corresponds to step 240 of method 200.
Prog(PROG,SEP,IN,OUT)
Reg(PROG,SEP,IN,OUT,R1, . . . , RN)

Combinations of program components satisfying the preceding formulae form one or more output programs. The formation of the output program(s) corresponds to step 250 of method 200.

Figure 3:
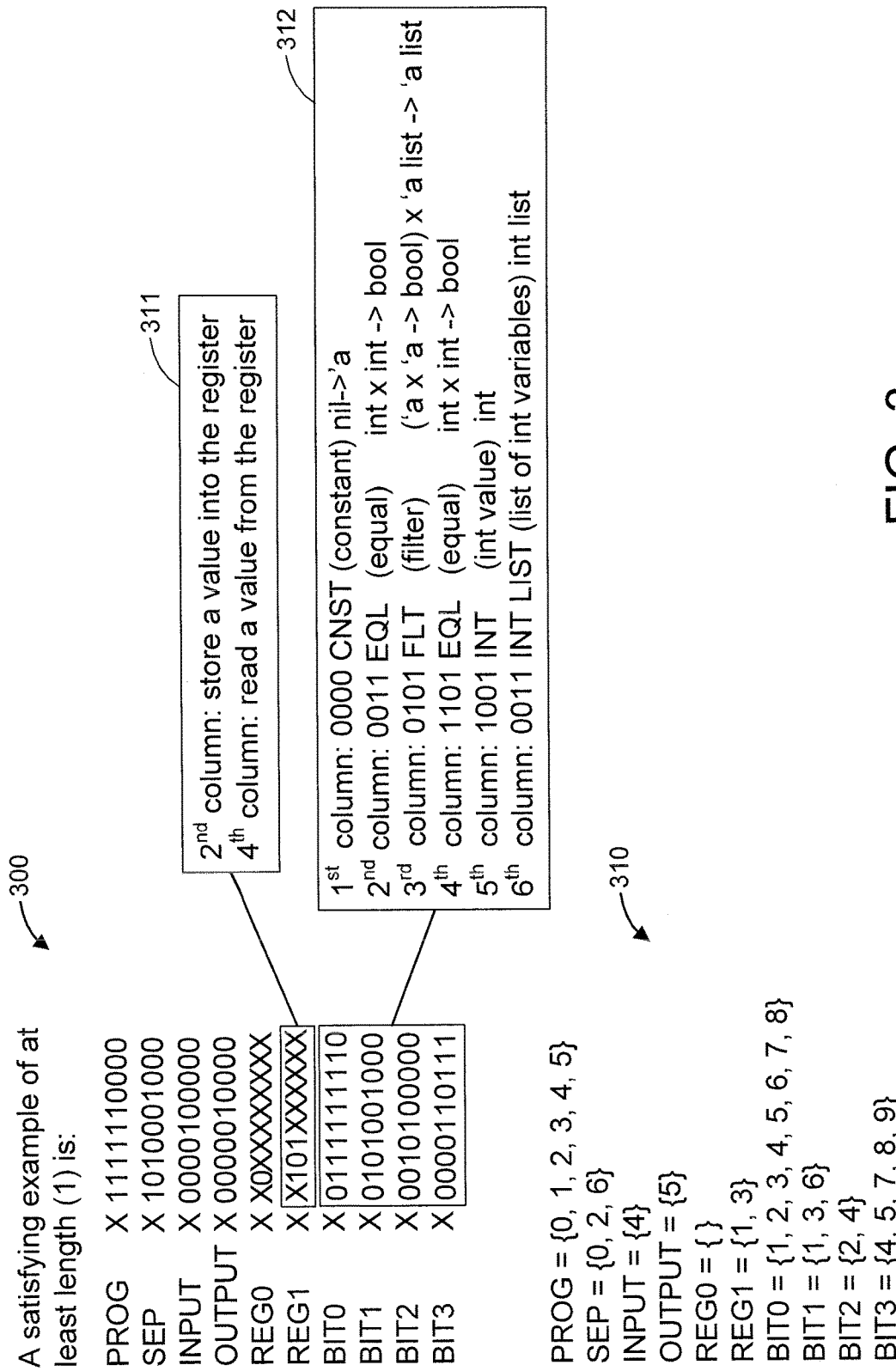
FIG. 3 shows an exemplary output computer program 300 synthesized in accordance with an embodiment of the present principles.

FIG. 3 shows an exemplary output computer program 300 synthesized in accordance with an embodiment of the present principles.

The output computer program 300 is a satisfying example of the formulae generated in accordance with the present principles to achieve program synthesis, with a length of at least 10. Element 310 is another set-based representation of the element 300.

Element 311 corresponds to REG1 which is a position set variable representing a register. The second column and the fourth column represent storing a value into the register and reading a value from the register, respectively. Element 312 corresponds to a set of position set variables BIT0, BIT1, BIT2 and BIT3, where the n-th column corresponds to a n-th program instruction or value. For example, the first column is "0000", which represents an instruction of creating a constant value.

Definitions of some of the utility predicates used above will now be given. The definitions are described with respect to MONA and the C programming language preprocessor. As known to those of ordinary skill in the art, MONA is a computer programming tool which acts as a decision procedure and as a translator to finite-state automata.

In MONA, the syntax "pred Xxxx= . . . " is used to define predicate Xxxx, "var2 XX" declares position set variable XX, and "var1 xx" declares position variable.

"#define closure(F,SEP,C)<MONA-code>" is the code of the C preprocessor that is used to replace all occurrences of "closure( . . . )" with "<MONA-code>"

pred consecutive(var1 p, var1 q, var2 R)=(p<q & p in R & q in R & (all1 r: p<r&r<q=>r not in R))
pred OutOfProg(var1 o, var2 P, var2 SEP)=ex1 r1: o in P & r1 in SEP & o+1=r1;
pred InSetOfProg(var2 I, var2 P, var2 SEP)=ex1 r1,r2: consecutive(r1,r2,SEP) & seqr(I,P,r1+1,r2−1);
pred InOfProg(var1 i, var2 P, var2 SEP)=ex2 I: InSetOfProg(I,P,SEP) & i in I;
define closure(F,SEP,C) \
(min(F) in SEP & max(F)+1 in SEP \
& (all1 r1,r2: consecutive(r1,r2,SEP) \
=>ex2 S: seqr(S,F,r1,r2) & C(S,BITS)))

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for synthesizing a computer program by a hardware processor and a program synthesizer, the method comprising:

representing program components and registers by position set variables and constraints on the position set variables using Monadic Second-Order Logic, the constraints comprising one or more register syntax constraints;

determining potential combinations of the program components by solving the constraints; and forming the computer program by automatically synthesizing the computer program from at least one of the potential combinations, the automatically synthesizing being performed using the program synthesizer executing on the hardware processor.

2. The method of claim 1, further comprising generating the constraints as formulae implementing a high-level specification formed from at least the position set variables, wherein said forming step forms the computer program by determining the potential combinations of the program components that that satisfy the formulae.

3. The method of claim 1, wherein the computer program components include a set of first-order functions and a set of second-order functions.

4. The method of claim 3, wherein said representing step comprises representing a given function in any of the set of first order functions and the set of second order functions as a constraint on the given function, wherein the constraint is represented by consecutive positions in the Monadic Second-Order Logic that are filled by a predicate for the given function, parameters of the given function, and a return value of the given function.

5. The method of claim 1, wherein the constraints are formed as one or more formulas.

6. The method of claim 1, wherein the constraints are solved using a Monadic Second-Order solver.

7. The method of claim 1, wherein the constraints comprise constraints on syntax of statements forming the computer program and ensure that the computer program includes the statements.

8. The method of claim 7, wherein the statements comprise one or more statements involving a set of first-order functions, and one or more other statements involving a set of second-order functions.

9. The method of claim 8, wherein a joining statement is used to join the one or more statements involving the set of first-order functions and the one or more other statements involving the set of second-order functions.

10. The method of claim 9, wherein the joining statement is a logical OR operation.

11. The method of claim 7, wherein the statements include a function, parameters of the function, and a return variable of the function.

12. The method of claim 1, wherein the constraints comprise one or more dataflow constraints.

13. The method of claim 12, wherein the one or more dataflow constraints comprise constraints on read variables and write variables with respect to dataflow.

14. A computer program product for synthesizing a computer program by a hardware processor and a program synthesizer, the computer program product comprising a non-transitory computer readable storage medium having program instructions embodied therewith, the program instructions executable by a computer to cause the computer to perform a method comprising:

representing program components and registers by position set variables and constraints on the position set variables using Monadic Second-Order Logic, the constraints comprising one or more register syntax constraints;

determining potential combinations of the program components by solving the constraints; and forming the computer program by automatically synthesizing the computer program from at least one of the potential combinations, the automatically synthesizing being performed using the program synthesizer executing on the hardware processor.

15. The method of claim 14, further comprising generating the constraints as formulae implementing a high-level specification formed from at least the position set variables, wherein said forming step forms the computer program by determining the potential combinations of the program components that that satisfy the formulae.

16. The method of claim 14, wherein the computer program components include a set of first-order functions and a set of second-order functions.

17. The method of claim 16, wherein said representing step comprises representing a given function in any of the set of first order functions and the set of second order functions as a constraint on the given function, wherein the constraint is represented by consecutive positions in the Monadic Second-Order Logic that are filled by a predicate for the given function, parameters of the given function, and a return value of the given function.

18. The method of claim 14, wherein the constraints comprise constraints on syntax of statements forming the computer program and ensure that the computer program includes the statements.

19. The method of claim 18, wherein the statements comprise one or more statements involving a set of first-order functions, and one or more other statements involving a set of second-order functions.

* * * * *